United States Patent
Horii

(10) Patent No.: US 12,547,155 B2
(45) Date of Patent: Feb. 10, 2026

(54) CELL CONTROLLER

(71) Applicant: OKUMA Corporation, Aichi (JP)

(72) Inventor: Shimpei Horii, Aichi (JP)

(73) Assignee: OKUMA CORPORATION, Aichi (JP)

( * ) Notice: Subject to any disclaimer, the term of this patent is extended or adjusted under 35 U.S.C. 154(b) by 68 days.

(21) Appl. No.: 18/497,490

(22) Filed: Oct. 30, 2023

(65) Prior Publication Data

US 2024/0152117 A1   May 9, 2024

(30) Foreign Application Priority Data

Nov. 4, 2022  (JP) ................... 2022-177408

(51) Int. Cl.
| | | |
|---|---|---|
| *B25J 9/16* | (2006.01) | |
| *B25J 19/06* | (2006.01) | |
| *G05B 19/418* | (2006.01) | |

(52) U.S. Cl.
CPC ...... *G05B 19/41815* (2013.01); *B25J 9/1653* (2013.01); *B25J 9/1682* (2013.01); *B25J 19/06* (2013.01); *G05B 2219/31076* (2013.01); *G05B 2219/35266* (2013.01); *G05B 2219/35494* (2013.01)

(58) Field of Classification Search
CPC .... G05B 19/41815; G05B 2219/31076; G05B 2219/35266; G05B 2219/35494; G05B 19/41865; G05B 23/0267; B25J 9/1653; B25J 9/1682; B25J 19/06; B25J 9/1674; B25J 9/1661

See application file for complete search history.

(56) References Cited

U.S. PATENT DOCUMENTS

| | | | |
|---|---|---|---|
| 2006/0031715 A1 | 2/2006 | Klein et al. | |
| 2016/0085235 A1 | 3/2016 | Kamijo | |
| 2017/0212507 A1* | 7/2017 | Naito ................. | G05B 19/4188 |
| 2020/0086489 A1 | 3/2020 | Goto | |
| 2020/0192337 A1* | 6/2020 | Hoffman .......... | G05B 19/41865 |

(Continued)

FOREIGN PATENT DOCUMENTS

| | | |
|---|---|---|
| CN | 115836307 A | 3/2023 |
| JP | 2000267726 A | 9/2000 |

(Continued)

OTHER PUBLICATIONS

JPO Notice of Reasons for Refusal for corresponding JP Application No. 2022-177408; Issued Dec. 16, 2025.

*Primary Examiner* — Bao Long T Nguyen
(74) *Attorney, Agent, or Firm* — CANTOR COLBURN LLP

(57) ABSTRACT

A cell controller controls a machining cell including a plurality of work resources. The plurality of work resources include at least one processing machine and at least one robot. The cell controller includes a PLC and a management device. The PLC controls operation of the work resources in accordance with an instruction from the management device, and acquires conditions of a plurality of work elements including the work resources and a workpiece. The management device, in response to occurrence of abnormal stop of the machining cell, specifies a recoverable condition of each work element, and presents to an operator a guide to a recovery procedure that enables each work element to transition to the recoverable condition.

12 Claims, 10 Drawing Sheets

(56) References Cited

U.S. PATENT DOCUMENTS

| | | | |
|---|---|---|---|
| 2021/0181717 A1* | 6/2021 | Mizuno | G05B 19/4155 |
| 2022/0147027 A1 | 5/2022 | Ryoki et al. | |
| 2023/0244222 A1 | 8/2023 | Adisaw et al. | |

FOREIGN PATENT DOCUMENTS

| | | | |
|---|---|---|---|
| JP | 2016066200 A | 4/2016 |
| JP | 2017130094 A | 7/2017 |
| JP | 2020046717 A | 3/2020 |
| JP | 2021096550 A | 6/2021 |
| JP | 2022077910 A | 5/2022 |
| WO | 2020194752 A1 | 10/2020 |

* cited by examiner

| ALARM NO. | 1 | 2 | . . . |
|---|---|---|---|
| ALARM CODE | 1 | 1 | . . . |
| ROBOT | ORIGINAL POSITION | ORIGINAL POSITION | . . . |
| HAND | OPEN | OPEN | . . . |
| PROCESSING MACHINE | STOP | OPERATING | . . . |
| PERIPHERAL INSTRUMENT | STOP | STOP | . . . |
| SEQUENCE NO. | 4 | 6 | . . . |
| 1ST WORKPIECE | PALLET | MAIN SPINDLE | . . . |
| 2ND WORKPIECE | PALLET | PALLET | . . . |
| 3RD WORKPIECE | PALLET | PALLET | . . . |

| STOP TIME CONDITION | RECOVERABLE CONDITION | PROCEDURE | | | | | | | | |
|---|---|---|---|---|---|---|---|---|---|---|
| OPERATING | OPERATING | ST0 | | | | | | | | |
| | STOPPING | ST1 | ST2 | ST3 | ST4 | ST5 | ST6 | ST7 | | |
| | OPERATION PREPARATION OFF | ST1 | ST2 | ST3 | ST4 | ST5 | ST6 | | | |
| | LINKAGE OFF | ST1 | ST2 | ST3 | ST4 | ST5 | | | | |
| | POWER OFF | ST1 | ST2 | ST3 | ST4 | ST5 | ST8 | | | |
| STOPPING | OPERATING | ST0 | | | | | | | | |
| | STOPPING | ST1 | ST2 | ST3 | ST4 | ST5 | ST9 | ST10 | | |
| | OPERATION PREPARATION OFF | ST1 | ST2 | ST3 | ST4 | ST5 | ST6 | | | |
| | LINKAGE OFF | ST1 | ST2 | ST3 | ST4 | ST5 | ST8 | | ST6 | |
| | POWER OFF | ST1 | | | | | | | | ST7 |
| ... | ... | ... | ... | ... | ... | ... | ... | ... | ... | ... |

| | |
|---|---|
| ST0 | (NO PROCEDURE) |
| ST1 | DEACTIVATE OPERATION PREPARATION |
| ST2 | DEACTIVATE LINKAGE |
| ST3 | RETRACT TOOL REST TO SAFE DIRECTION |
| ST4 | MOVE TOOL REST TO LIMIT |
| ST5 | PRESS RESET BUTTON |
| ST6 | ACTIVATE LINKAGE |
| ST7 | ACTIVATE OPERATION PREPARATION |
| ST8 | POWER OFF |
| ST9 | SELECT (PROGRAM NAME TO BE OPERATED) |
| ST10 | START NC |
| ST11 | POWER ON |

FIG. 4

CELL CONTROLLER

CROSS REFERENCE TO RELATED APPLICATIONS

The present invention claims priority under 35 U.S.C. § 119 to Japanese Application, 2022-177408, filed on Nov. 4, 2022, the entire contents of which being incorporated herein by reference.

TECHNICAL FIELD

The present disclosure discloses a cell controller that controls a machining cell including a plurality of work resources.

BACKGROUND

A machining cell including a plurality of work resources, such as processing machines and robots, has been known (see JP 2022-077910 A, for example). A machining cell enables automated successive execution of delivery, attachment, machining, and post-processing, for example, of workpieces, under control of a cell controller. The cell controller outputs a command corresponding to an item of an article to be produced, to a plurality of work resources constituting the machining cell.

The machining cell may stop abnormally due to various factors, and at the time of abnormal stop, the operator has been responsible for determining operation contents required for recovery. More specifically, in response to occurrence of abnormal stop of the machining cell, the operator recognizes the content of an alarm and conditions of a plurality of work elements, such as processing machines and workpieces, associated with the machining cell, and then specifies and executes necessary operation for recovery, based on acquired information.

However, collecting information regarding the conditions of the work elements to specify the recovery operation requires sufficient knowledge and experiences. Configurations of some cell controllers may require direct operation of a PLC for recovery, which requires persons familiar with the PLC language, making it difficult for the operator to recover the machining cell.

An embodiment of the disclosure is therefore aimed toward providing a cell controller which enables an operator to recover a machining cell that has stopped abnormally.

SUMMARY

In accordance with an aspect of the disclosure, a cell controller is configured to control a machining cell including a plurality of work resources. The plurality of work resources include at least one processing machine and at least one robot. The cell controller includes a PLC and a management device. The PLC is configured to control operation of the plurality of work resources in accordance with an instruction from the management device and acquire conditions of a plurality of work elements including the plurality of work resources and a workpiece. In response to occurrence of abnormal stop of the machining cell, the management device is configured to specify a recoverable condition of each of the plurality of work elements and present, to an operator, a guide to a recovery procedure that enables each of the plurality of work elements to transition to the recoverable condition.

The cell controller determines the recovery procedure and presents a guide to the operator. This enables the operator with poor knowledge and experiences to properly recover the machining cell.

In this configuration, the management device may pre-store recovery condition information including the recoverable condition of each of the plurality of work elements recorded for each alarm type, and transition information including the recovery procedure of each of the plurality of work elements recorded in association with the recoverable condition. The management device may be configured to specify the recoverable condition of each of the plurality of work elements based on the recovery condition information, and specify the recovery procedure based on the transition information.

This configuration enables easy and proper specification of the recovery procedure.

Further, the management device may be configured to change a UI device that presents the guide, in accordance with each of the plurality of work elements.

The specific contents of the recovery procedures differ among the work elements. Changing the UI device that presents the recovery procedure in consideration of such differences enables the operator to execute the recovery procedure more easily.

In this configuration, the machining cell may include a safety fence that surrounds the at least one robot, and the management device may include a first UI device disposed outside the safety fence. The cell controller may further include a second UI device that is portable and enables manual operation of the at least one robot. The management device may be configured to present the guide related to the at least one processing machine to the operator via the first UI device and present the guide related to the at least one robot to the operator via the second UI device.

The recovery procedure for the robot is often performed within the safety fence. The above configuration therefore enables the operator to check the guide in the vicinity of a site where the recovery procedure is performed, and thereby facilities the operator's execution of the recovery procedure.

Further, the management device may be configured to change a UI device to be operated by the operator that performs the recovery procedure, in accordance with each of the plurality of work elements.

Changing the UI device to be operated by the operator in accordance with properties of the work element leads to an increase in operation performance of the operator.

In this configuration, the at least one processing machine may include an NC operation panel. The cell controller may further include a second UI device that is portable and enables manual operation of the at least one robot. The recovery procedure related to the at least one processing machine may include operation of the NC operation panel, and the recovery procedure related to the at least one robot may include operation of the second UI device.

Many operators are familiar with operation of the processing machine using the NC operation panel. The portable second UI device enables the operator to operate the robot at locations adjacent to the robot while visually confirming the position of the robot. The above configuration therefore enables the operator to easily place the processing machine and the robot in the recoverable conditions.

Further, the at least one processing machine may include an NC operation panel, and the management device may include a first UI device. The recovery procedure related to the at least one processing machine may include operation of the NC operation panel, and the management device presents the guide related to the at least one processing machine to the operator via the first UI device.

Disposing a UI device that presents the recovery procedure and a UI device that is actually operated separately prevents the guide screen from obstructing operation of the processing machine.

The recovery procedure related to the workpiece may include movement of the workpiece and input operation of a location of the workpiece after being moved. The management device may register in the PLC the location of the workpiece after being moved, input by the operator.

This configuration enables correct understanding, by the cell controller, of the location of the workpiece after being moved.

The management device may present the guide related to the workpiece to the operator after completion of the recovery procedure related to the at least one robot.

Typically, the recovery procedure of the workpiece includes movement of the workpiece. The robot having certain positions may obstruct the movement of the workpiece. However, it is not likely that the robot obstructs the movement of the workpiece after the recovery procedure of the robot is completed and the robot is placed in the recoverable condition.

In accordance with another aspect, a cell controller is configured to control a machining cell including a plurality of work resources including at least one processing machine and at least one robot. The cell controller includes a processor, a memory, and at least one UI device. The processor is configured to: control operation of the plurality of work resources and acquire conditions of a plurality of work elements including the plurality of work resources and a workpiece; in response to occurrence of abnormal stop of the machining cell, specify a recoverable condition of each of the plurality of work elements; and present a guide to a recovery procedure to the operator via the at least one UI device wherein the recovery procedure enables each of the plurality of work elements to transition to the recoverable condition.

The technique disclosed in the present specification enables an operator to easily recover a machining cell in response to abnormal stop of the machining cell.

BRIEF DESCRIPTION OF DRAWINGS

Embodiments of the present disclosure will be described based on the following figures, wherein:

FIG. 2 is a chart showing example recovery condition information;

FIG. 3 is a chart showing example transition information of a processing machine;

FIG. 4 is a chart explaining codes in FIG. 3;

DESCRIPTION OF EMBODIMENTS

Figure 1:
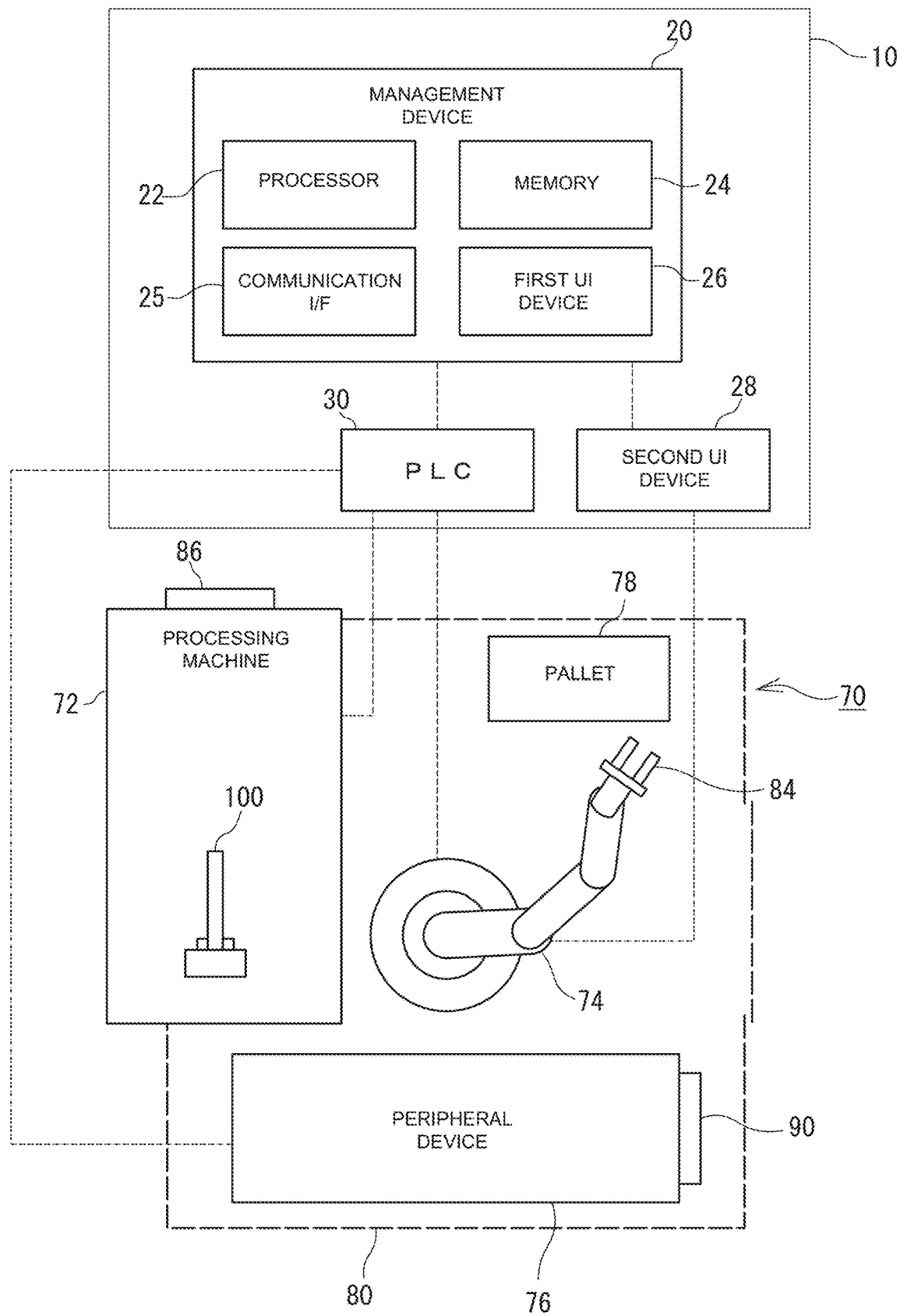
FIG. 1 illustrates configurations of a cell controller and a machining cell.

The configuration of a cell controller 10 will be described by reference to the drawings. FIG. 1 illustrates configurations of the cell controller 10 and a machining cell 70 to be controlled by the cell controller 10. The machining cell 70 or a control target will be first described. The machining cell 70 includes one or more processing machines 72, and performs various processes on a workpiece 100. The machining cell 70 in this example includes the processing machine 72, a robot 74, a peripheral device 76, and a pallet 78. The processing machine 72 is a metal working machine that processes metal material, for example. In this example, the processing machine 72 is a cutting machine that performs cutting on the workpiece 100, and is specifically a lathe. The processing machine 72 includes a Numerical Control (NC) operation panel 86 or a UI device that operates the processing machine 72. In this disclosure, the term "UI device" refers to a user interface device having an output device that presents information and an input device that receives an operation input. The output device includes at least one of a display, a speaker, and a lamp. The input device includes at least one of a switch, a keyboard, a mouse, a touch panel, and a microphone.

The robot 74 is disposed to assist processing of the workpiece 100 performed by the processing machine 72, and delivers the workpiece 100 and jaws of a chuck used in the processing machine 72, for example. In this example, the robot 74 is an articulated serial manipulator having a plurality of links connected via joints. A hand 84 is replaceably attached to the tip of the robot 74 to hold the workpiece 100, for example. The operation mode of the robot 74 is switchable between a manual mode in which the robot is operated manually by an operator, and an automatic mode in which the robot operates automatically. In the automatic mode, law requires that the robot 74 be enclosed by a safety fence. Therefore, in this example, the entire machining cell 70 is surrounded by a safety fence 80.

The peripheral device 76 performs pre-processing or post-processing with respect to the workpiece 100, and assists the operation of the processing machine 72 or the robot 74. The peripheral device 76 may include a cleaner that cleans at least one of the workpiece 100 and the robot 74, for example. The peripheral device 76 may further include a measuring device that measures an object such as the workpiece 100. The peripheral device 76 includes a peripheral device operation panel 90 that is used for operating the peripheral device 76. The peripheral device 76 having a simple configuration may include the peripheral device operation panel 90 including only a plurality of buttons such as a power button and a reset button. The pallet 78 is a site where the workpiece 100 is placed for standby.

In the following description, an element that constitutes the machining cell 70 and contributes production of a product will be referred to as a "work element". The work element includes the processing machine 72, the robot 74, the peripheral device 76, the workpiece 100, the pallet 78, and the safety fence 80 described above, for example. An element among the work elements that receives an operation command from the cell controller 10, which will be described below, will be referred to as a "work resource". The work resource includes the processing machine 72, the robot 74, and the peripheral device 76.

The machining cell 70 illustrated in FIG. 1 is an example; therefore, the machining cell 70 may have any other modified configurations including one or more processing machines 72 and one or more robots 74. For example, the numbers of the processing machines 72, the robots 74, and the peripheral devices 76 may be changed as appropriate. The types and numbers of the work resources and the work elements may also be changed as appropriate. The machining cell 70 may therefore include, in addition to the processing machine 72, the robot 74, and the peripheral device 76, an additional work resource, such as a painting device. The machining cell 70 may further include an additional work element, such as a stocker that stores the hand 84, for example, and a work mount where the workpiece 100 is temporarily placed.

The cell controller 10 controls operation of the machining cell 70 described above. More specifically, the cell controller 10 collectively controls operation of a plurality of work resources disposed in the machining cell 70. To produce articles of necessary items in the necessary number, the cell controller 10 monitors conditions of the work elements and provides commands to the work resources, such as the processing machine 72 and the robot 74.

The cell controller 10 includes a management device 20, a programmable logic controller or PLC 30, and a second UI device 28.

The management device 20 and the PLC 30 are computers that are independent of and physically apart from each other. The PLC 30 receives input signals from the work elements of the machining cell 70, performs operation for sequence control based on the received input signals, and outputs an operation command to the work resources.

The PLC 30 controls operation of the work resources based on a PLC program that includes a special program language such as a ladder language. However, special knowledge is required for creating the PLC program; it is therefore difficult for a manager or operator of the machining cell 70 to create or correct the PLC program by him/herself.

In this example, the cell controller 10 includes the management device 20 in addition to the PLC 30. The management device 20 controls the PLC 30 based on a production program which is easy for the operator to create. Here, the production program is a program that records one or more processes to be executed for producing only one article with the machining cell 70. The production programs in the number corresponding to the number of items to be produced by the machining cell 70 are therefore prepared. The management device 20, on receiving a production program that is input, converts the production program in a format which is interpretable by the PLC 30 and then outputs the production program to the PLC 30.

The management device 20 is a computer that is independent of the PLC 30 and includes a processor 22, a memory 24, a communication I/F 25, and a first UI device 26. Typically, the management device 20 is disposed outside the safety fence 80.

The second UI device 28 is a portable UI device that is communicable with the management device 20. In other words, the second UI device 28 can be treated within the safety fence 80. The second UI device 28 therefore functions as a teaching pendant. As will be described below, the operator operates the second UI device 28 to enable manual operation of the robot 74. Each of the first UI device 26 and the second UI device 28 includes a display that presents information to the operator, and an input device that receives an operation instruction from the operator.

As described above, the cell controller 10 controls operation of the machining cell 70 based on the production program input by the operator. The processing by the cell controller 10 is implemented using the technique disclosed in JP 2022-077910 A, for example. The machining cell 70 may stop abnormally during operation due to some reasons. In such a case, to enable the machining cell 70 to recover from the abnormal stopping, it is necessary to allow the work elements to transition to recoverable conditions. Consider a case where an alarm with an alarm number "1" is issued and the machining cell 70 abnormally stops. In this case, to enable the machining cell 70 to recover properly, it is necessary to place the robot 74 in an original position or original posture, place the hand 84 in an open state, stop the operation of the processing machine 72, stop the operation of the peripheral device 76, set a sequence number of the production program to be executed at the time of recovery to "4", and place the workpiece 100 on the pallet 78, as shown in FIG. 2. To move the robot 74 to the original position, it is necessary to release linkage between the robot 74 and other work resources, or change the operation mode of the robot 74 to the manual mode, or execute other various procedures.

As described above, a procedure that is necessary for transition to a recoverable condition, which will be hereinafter referred to as a "recovery procedure", depends on situations at the time of abnormal stop, such as different alarm numbers assigned to issued alarms. This makes it difficult for the operator to determine and execute the recovery procedure by him/herself. In this example, in response to abnormal stop of the machining cell 70, the cell controller 10 presents a guide to the recovery procedure to the operator. This function to present a guide will be described in detail below.

The management device 20 prestores recovery condition information 50 and transition information 52 in the memory 24 for the recovery procedure. The recovery condition information 50 refers to data of recoverable conditions for the respective work elements, recorded corresponding to each alarm type. FIG. 2 shows example recovery condition information 50. As shown in FIG. 2, in the recovery condition information 50, each work element is associated with a recoverable condition. The recoverable condition may vary among different alarm numbers indicating causes of abnormal stops. For example, the recoverable condition of the processing machine 72 is "stop" in response to abnormal stop identified with the alarm number "1", and is "operating" in response to abnormal stop identified with the alarm number "2". Thus, the recovery condition information 50 records the recoverable conditions corresponding to the respective alarm numbers. While FIG. 2 illustrates, as the work elements, only the robot 74, the hand 84, the processing machine 72, the peripheral device 76, the sequence numbers of the production programs, and the workpieces 100, the numbers or types of the work elements whose recoverable conditions are determined for recovery may be changed as appropriate in accordance with the configuration of the machining cell 70. For example, the recoverable conditions of the work elements such as jigs for use in the processing machine 72, such as a chuck jaw, may also be determined.

The transition information 52 refers to recoded data of recovery procedures required for transition of the work elements from a stop time condition to a recoverable condition. Here, the stop time condition refers to a condition of the working element at the time of abnormal stop of the machining cell 70. The transition information 52 is prepared for each work element. FIG. 3 shows example transition information 52 for the processing machine 72, and FIG. 4 shows explanations of codes in FIG. 3.

A plurality of combinations of the stop time condition and the recoverable condition may be assumed. As shown in FIG. 3, the transition information 52 records the recovery procedure for each of these combinations. It is assumed, for example, that the stop time condition (see the first column in the table in FIG. 3) is "operating" and the recoverable condition (see the second column in the table in FIG. 3) is "operating". In this case, the stop time condition (operating) corresponds to the recoverable condition (operating), no recovery procedure is necessary for transition of condition. The transition information 52 therefore records "ST1: no procedure". It is further assumed that the stop time condition is "operating" and the recoverable condition is "stopping". In this case, the transition information 52 shows recorded data of a procedure necessary for stopping the processing machine 72, including, in sequence, "ST1: operation preparation OFF", "ST2: linkage OFF", and the like.

The management device 20 further stores messages that encourage the operator to execute the recovery procedure in association with the respective procedures, although not shown in the figure. For example, the management device 20 stores a message "Please deactivate operation preparation" in association with the procedure "ST1: operation preparation OFF". In requesting the operator for execution of the procedure "ST1: operation preparation OFF", the management device 20 displays the associated message on the first UI device 26 or the second UI device 28.

Figure 5:
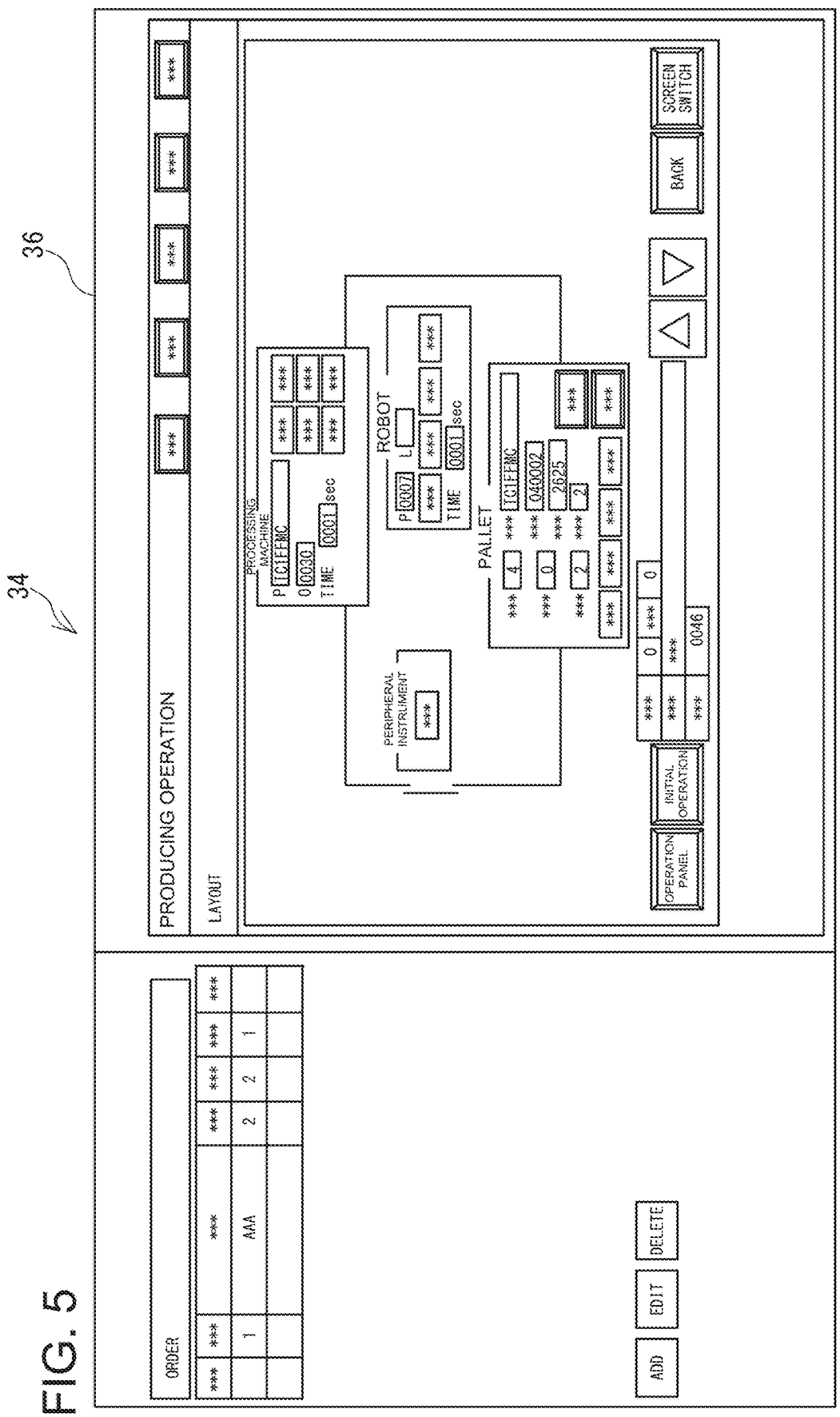
FIG. 5 illustrates an example management screen displayed on a main display.

The guide to the recovery procedure or the recovery procedure guide will be now described by reference to FIG. 5 to FIG. 9. FIG. 5 illustrates an example of a management screen 36 on a display of the first UI device 26, which will be hereinafter referred to as a "main display 34". During normal operation of the machining cell 70, the main display 34 shows the management screen 36 as illustrated in FIG. 5. The management screen 36 includes a name of an item being currently produced and conditions of the work resources. The operator operates the input device of the first UI device 26 by reference to the display on the management screen 36 and inputs a necessary command.

Figure 6:
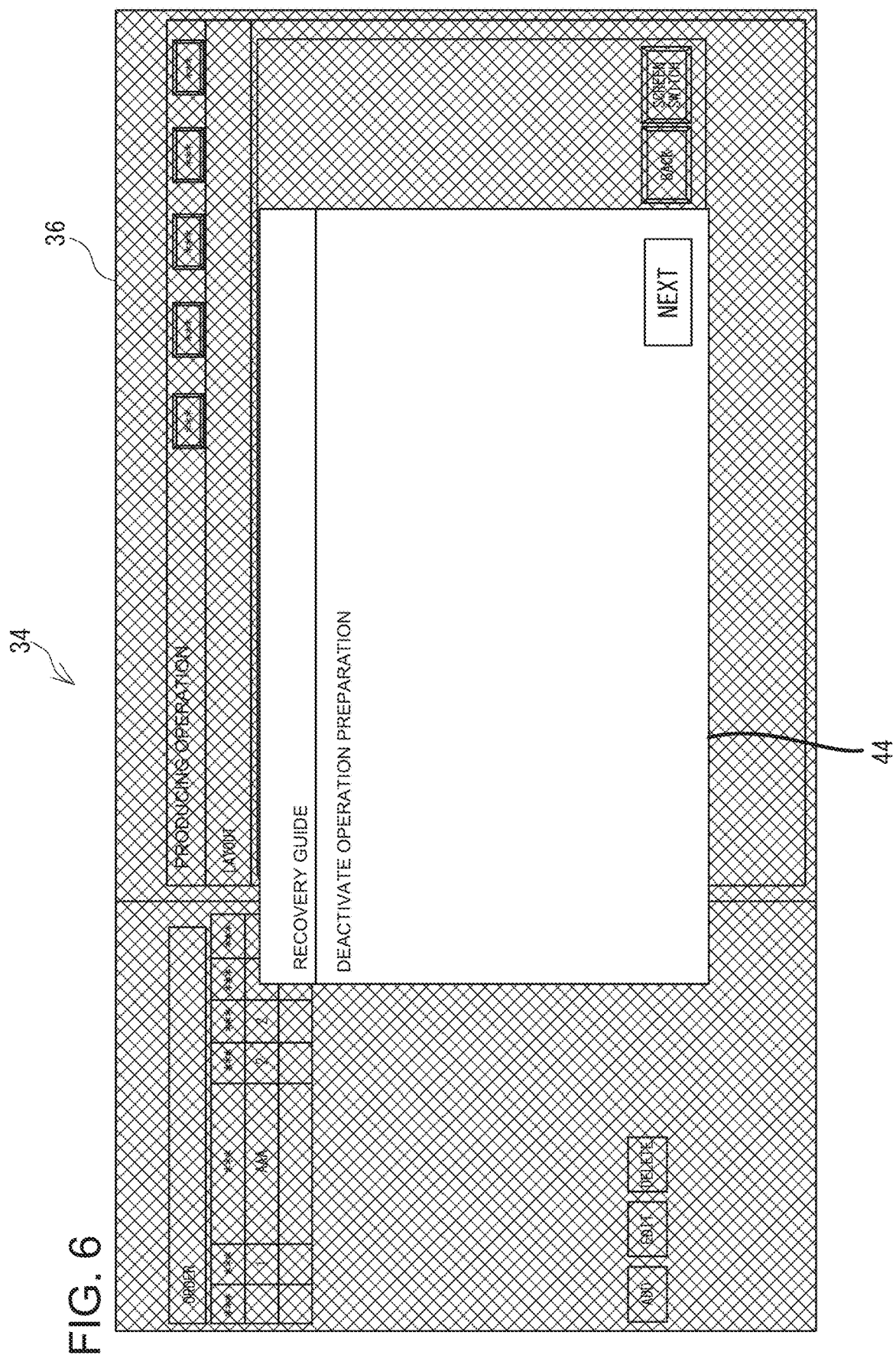
FIG. 6 illustrates an example displayed on the main display.

FIG. 6 illustrates an example guide screen 44 displayed on the main display 34 in order to guide the recovery procedure of the processing machine 72. At the time of occurrence of abnormal stop of the machining cell 70, the operator operates the input device of the first UI device 26 to instruct the management device 20 to start the recovery procedure guide. Receiving this instruction, the management device 20 compares the stop time condition with the recoverable condition of the processing machine 72. In response to the two conditions being not matched as a result of comparison, the management device 20 grays out the management screen 36 to disable operation, while displaying the guide screen 44 in a superposed manner on the management screen 36, as illustrated in FIG. 6.

The guide screen 44 shows a message that prompts execution of a procedure that is necessary for recovery of the processing machine 72. The management device 20 specifies the message to be displayed on the guide screen 44 by reference to the combination of the stop time condition and the recoverable condition in the transition information 52. The operator then executes the procedure that is necessary for recovery by reference to the guide screen 44. As described above, the procedure guide necessary for recovery that is presented to the operator enables the operator having no special knowledge about the cell controller 10 to appropriately and simply recover the machining cell 70 from abnormal stop.

Upon completing execution of the procedure presented on the guide screen 44, the operator notifies the management device 20 of completion of the procedure. In the example illustrated in FIG. 6, the operator presses a "NEXT" button displayed on the guide screen 44 to notify the management device 20 of completion of the procedure. After receiving the notification of completion of the procedure, the management device 20 confirms whether or not the next procedure is present, and, in the presence of the next procedure, displays a message that prompts the next procedure on the guide screen 44. In the absence of the next procedure, the management device 20 confirms the conditions of another work element, and starts a guide to a condition transition with respect to the other work element, as required.

The guide screen 44 related to the processing machine 72 is presented via the first UI device 26, and the recovery procedure related to the processing machine 72 includes operation of the NC operation panel 86. The operator therefore operates the NC operation panel 86 disposed on the processing machine 72 by reference to the guide screen 44 displayed on the main display 34 of the first UI device 26, to thereby allow the processing machine 72 to transition to the recoverable condition.

In many cases, the operator is more familiar with the operation of the NC operation panel 86 than with the operation of the cell controller 10. Therefore, a configuration that enables the operator to operate the NC operation panel 86 to thereby transition the processing machine 72 to the recoverable condition reduces the operator's burden. Typically, the operator performs operation to transition the processing machine 72 to the recoverable condition while checking various information displayed on the NC operation panel 86, which will be hereinafter referred to as "processing machine information". The NC operation panel 86 displaying not only this processing machine information but also the guide screen 44 would make it difficult for the operator to check the processing machine information, thereby deteriorating operability of the NC operation panel 86. In this embodiment, the guide screen 44 is displayed on the first UI device 26, which enables the operator to operate the NC operation panel 86 in a comfortable manner.

The recovery procedure and guide presentation for the peripheral device 76 will now be described. The guide screen 44 related to the peripheral device 76 is presented via the first UI device 26, and the recovery procedure related to the peripheral device 76 includes operation of the peripheral device operation panel 90.

Figure 7:
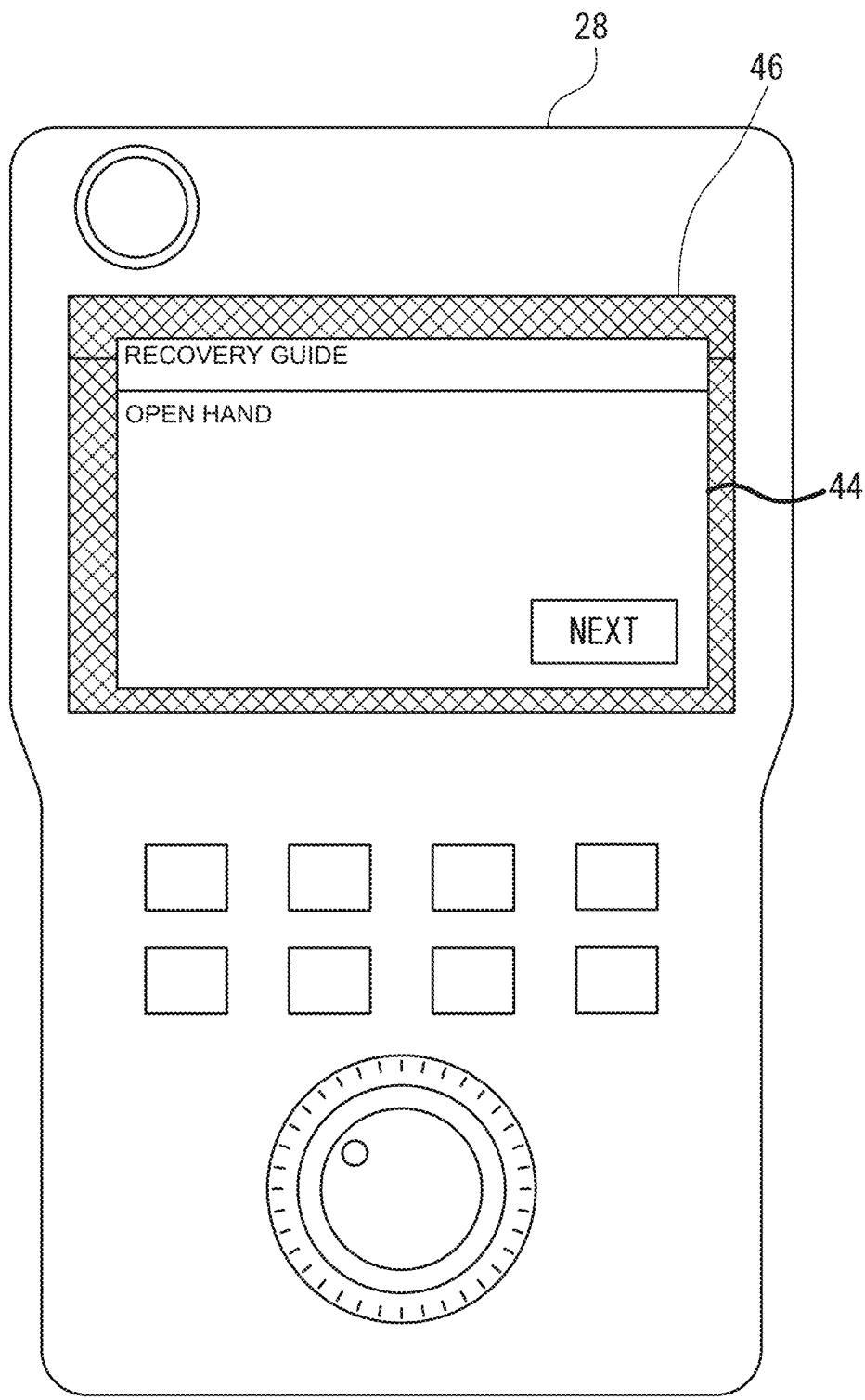
FIG. 7 illustrates an example second UI device that displays a guide screen.

The recovery procedure and guide presentation for the robot 74 will now be described. The guide screen 44 related to the robot 74, including the hand 84, is presented via the second UI device 28, and the recovery procedure related to the robot 74 includes operation of the second UI device 28. FIG. 7 illustrates an example of the second UI device 28 displaying the guide screen 44. Such a configuration will be described below.

To place the robot 74 into the recoverable condition, the operator needs to manually operate the robot 74 in the manual mode. To perform the manual operation, the operator needs to be located adjacent to the robot 74 to check the condition, such as the position, of the robot 74. As such, to place the robot 74 in the recoverable condition, the operator needs to be located adjacent to the robot 74.

The management device 20, and therefore the first UI device 26 are, however, disposed outside the safety fence 80 and distant from the robot 74. It is therefore difficult for the operator to operate the robot 74 with the first UI device 26. When the guide screen 44 related to the robot 74 is displayed on the display of first UI device 26, which will be hereinafter referred to as a "sub display 46", the operator needs to move back and forth between the robot 74 and the first UI device 26 to check the guide screen 44 and operate the robot 74 manually, which takes much time and labor. In this example, as described above, the robot 74 is operated with the portable second UI device 28, which displays the guide screen 44 on the sub display 46 disposed on the second UI device 28. This configuration enables the operator to check the guide screen 44 and manually operate the robot 74 while remaining located adjacent to the robot 74. To manually operate the robot 74, the operator only needs to see the outer appearance of the robot 74; precise inner information of the robot 74, such as a precise quantity of movement of the robot 74, is not necessary. It is therefore possible for the operator to manually operate the robot 74 while viewing the guide screen 44 displayed on the sub display 46.

Figure 8:
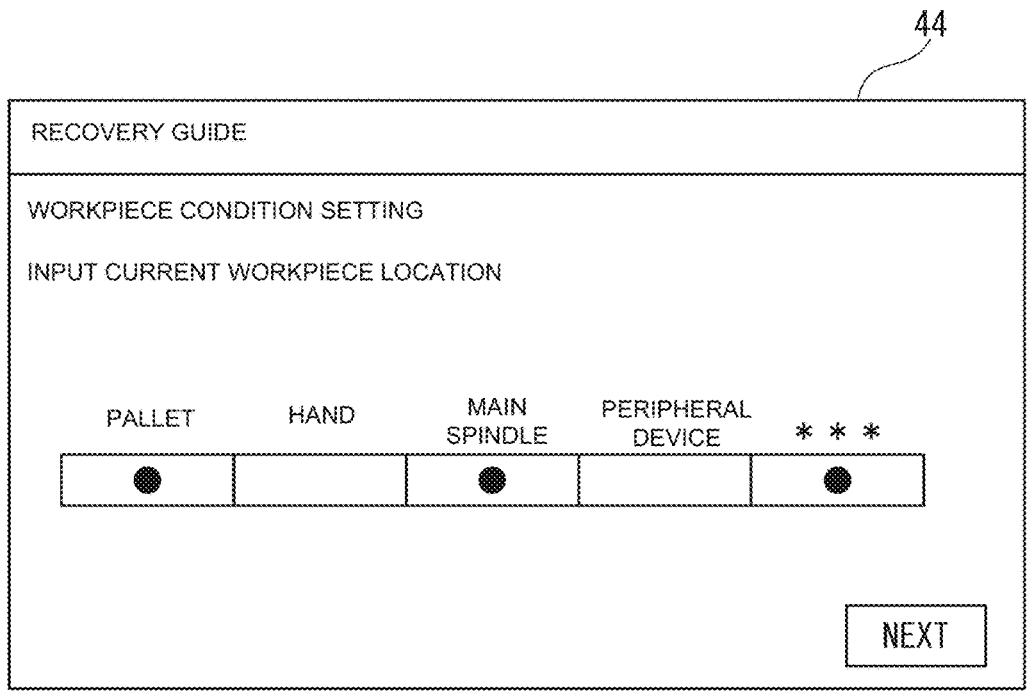
FIG. 8 illustrates an example guide screen regarding a workpiece.

The recovery procedure and guide presentation for the workpiece 100 will be described. Again, the management device 20 compares the stop time condition and the recoverable condition of the workpiece 100, as in the cases of the processing machine 72 and the robot 74, and, in response to these conditions not being matched, presents a guide to the recovery procedure. The guide screen 44 related to the workpiece 100 is displayed on the main display 34 of the first UI device 26. FIG. 8 shows an example of the guide screen 44 related to the workpiece 100. As is clear from FIG. 8, the recovery procedure related to the workpiece 100 includes movement of the workpiece 100 and input operation for the location of the moved workpiece 100. The operator, in accordance with the guide, manually moves the workpiece 100 to a designated location, and operates the input device of the first UI device 26 to select the location of the workpiece 100 after being moved. The management device 20 registers the selected location in the PLC 30 as the current location of the workpiece 100. This configuration will be described below.

To properly recover the machining cell 70 that has abnormally stopped, it is necessary to move the workpiece 100 to a specific location. The PLC 30 normally manages the progress of machining processing of products, and, based on the progress, specifies the location of the workpiece 100. In other words, the location of the workpiece 100 is not detected by a sensor, for example, and is only estimated based on the progress of machining. It is not therefore possible for the cell controller 10 to detect the location of the workpiece 100 which has been moved manually. In this example, the operator is allowed to input the location of the workpiece 100 during the process of the recovery procedure. This enables the cell controller 10 to recognize the location of the workpiece 100 in the absence of a special sensor for the workpiece 100. Further, to replace a jig, such as chuck jaw, in the processing machine 72, the jig is placed into the recoverable condition according to a recovery procedure that is similar to that for a workpiece.

Figure 9:
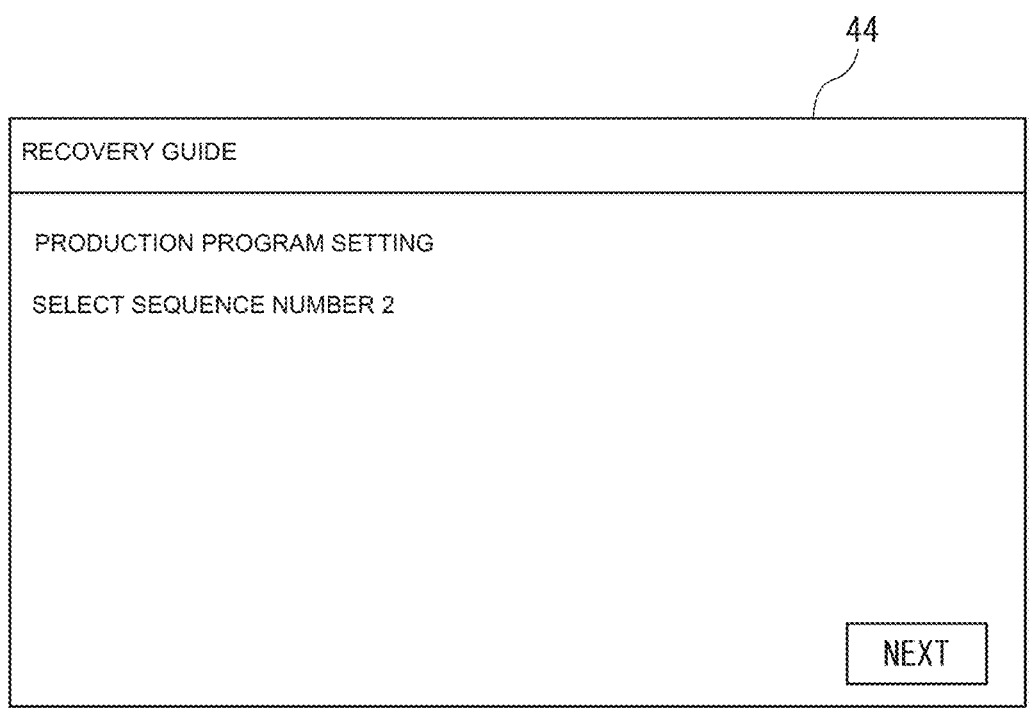
FIG. 9 illustrates an example guide screen regarding a production program.

The recovery procedure and guide presentation for the production program will now be described. As described above, the production programs according to products to be produced are registered in the machining cell 70. The production program includes a plurality of processes. Sequence numbers indicating processes, among the plurality of processes, to be executed at the time of recovery are prerecorded in the recovery condition information 50 as recoverable conditions. To properly recover the machining cell 70 that has abnormally stopped, a sequence number that is defined as the recoverable condition, which will be hereinafter referred to as a "recoverable sequence number", needs to be set in the cell controller 10. Therefore, in response to the sequence number that is set at the time of stop not being matched with the recoverable sequence number, the management device 20 displays, on the main display 34 of the first UI device 26, the guide screen 44 that prompts the operator to perform setting of the recoverable sequence number. FIG. 9 shows an example of the guide screen 44 related to the production program. The operator, according to the guide screen 44, operates the first UI device 26 to enter and set the recoverable sequence number designated by the guide screen 44. While in this example, setting of the sequence number is executed by the operator, setting of the sequence number may be automatically performed by the cell controller 10. Further, while in this example, only one number is presented to the operator as the recoverable sequence number, a plurality of numbers may be presented as the recoverable sequence numbers, among which one number may be selected by the operator. Alternatively, a plurality of numbers may be recorded, as the recoverable sequence numbers, in the recovery condition information 50, and the cell controller 10 may select one number from among the numbers. For example, among the plurality of numbers recorded in the recovery condition information 50, a number that is smaller than and closest to the sequence number indicating a process executed at the time of abnormal stop may be presented to the operator as a recoverable sequence number.

As is clear from the above description, in this example, the guides related to the processing machine 72, the peripheral device 76, the workpiece 100, and the production program are presented via the first UI device 26, and the guide related to the robot 74 is presented via the second UI device 28. As such, in this example, the UI device that presents a guide is changed in accordance with a work element. This configuration enables the operator to execute the recovery operation more easily. Further, in this example, the recovery operation related to the processing machine 72 includes the operation of the NC operation panel 86; the recovery operation related to the peripheral device 76 includes operation of the peripheral device operation panel 90; the recovery operation of the robot 74 includes operation of the second UI device 28; and the recovery operation related to the workpiece 100 and the production program includes operation of the first UI device 26. As such, in this example, the UI device that is operated for the recovery operation is changed in accordance with the work element. Changing the UI device to be operated in accordance with the characteristics of the work element as described above enables the operator to execute the recovery operation more easily.

Figure 10:
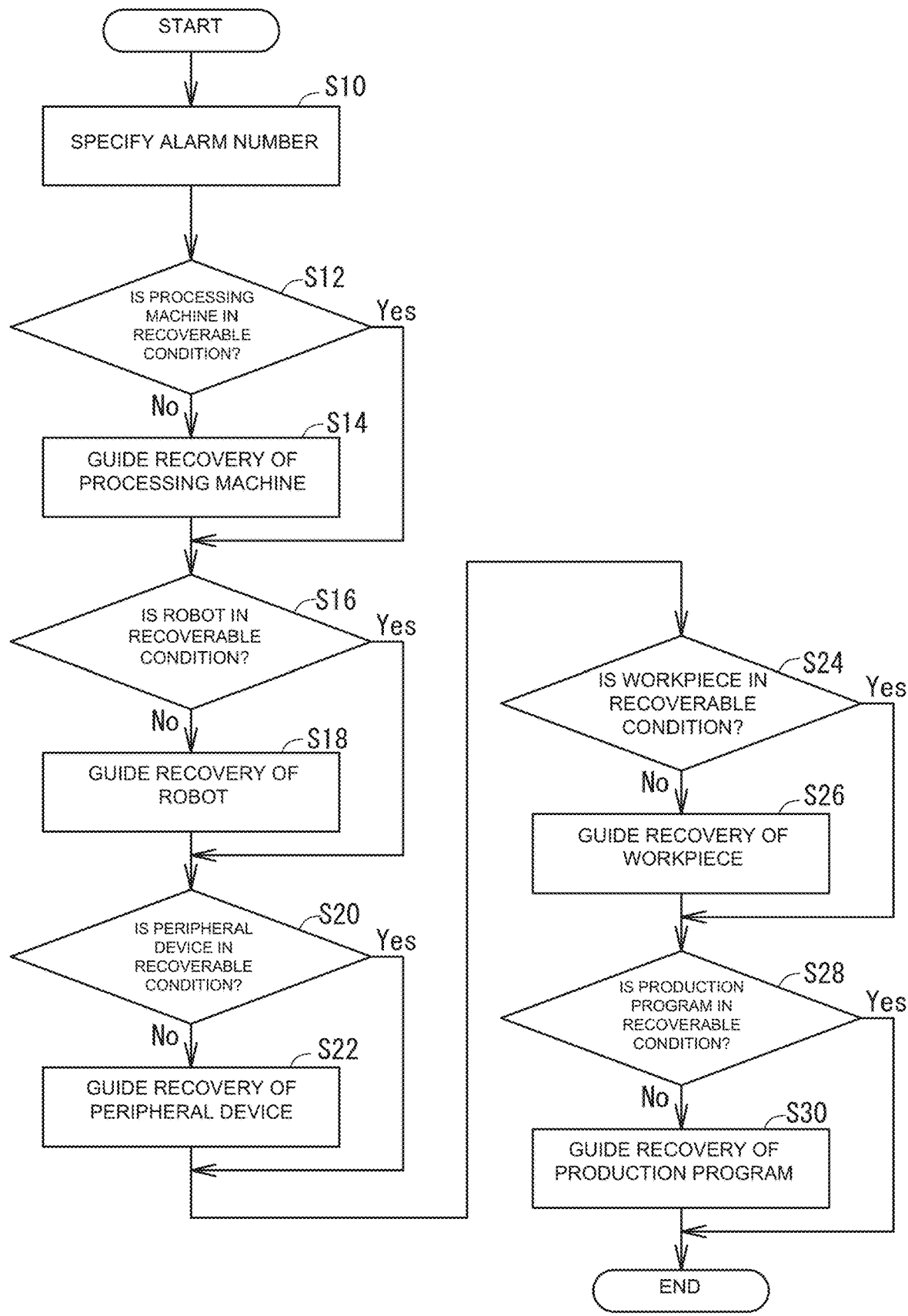
FIG. 10 is a flowchart showing a flow of guide processing of a recovery procedure performed by a management device.

The flow of guide processing of the recovery procedure performed by the management device 20 will be described by reference to FIG. 10. As shown in FIG. 10, the management device 20, in response to occurrence of abnormal stop, acquires and specifies an alarm number indicating a cause of the abnormal stop from the PLC 30 (S10).

The management device 20 then checks whether the processing machine 72 is in a recoverable condition (S12). More specifically, the management device 20 checks the specified alarm number against the recovery condition information 50 to specify the recoverable condition of the processing machine 72. The management device 20 further acquires, from the PLC 30, the condition of the processing machine 72 at the time of abnormal stop or the stop time condition. The management device 20 further compares the specified recoverable condition with the stop time condition. In response to the two conditions being matched as a result of comparison, the management device 20 determines that the processing machine 72 is in a recoverable condition, and the process proceeds to step S16.

Figure 11:
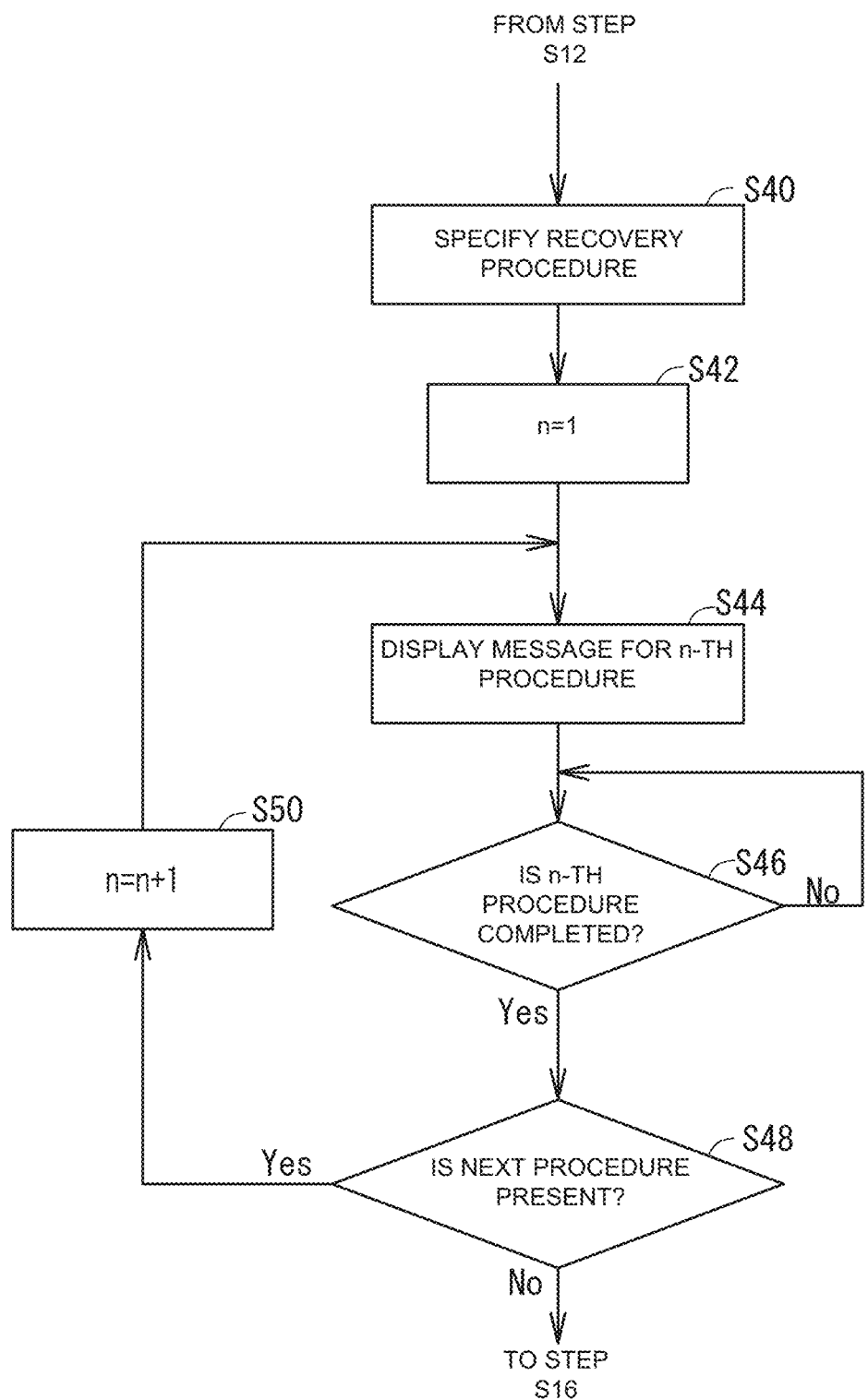
FIG. 11 is a flowchart showing a detailed flow of step S14 in FIG. 10.

In response to the recoverable condition and the stop time condition not being matched in step S12, the management device 20 determines that the processing machine 72 is not in a recoverable condition, and the process proceeds to step S14. In step S14, the management device 20 presents to the operator a guide to transition of the processing machine 72 to a recoverable condition, and the operator places the processing machine 72 in the recoverable condition. FIG. 11 is a flowchart showing a detailed flow of step S14. As shown in FIG. 11, to transition the condition of the processing machine 72, the management device 20 checks the stop time condition and the recoverable condition against the transition information 52 to specify the recovery procedure (S40).

The management device 20 then displays a message that prompts execution of the n-th (n is an integer of 1 or greater) procedure on the main display 34 of the first UI device 26 (S44). The management device 20 thereafter monitors whether execution of the n-th procedure has been completed (S46). In this example, in response to the operator's input of completion of execution of the n-th procedure and confirmation of completion of the n-th procedure by the PLC 30, completion of execution of the procedure is determined.

Consider a case where the n-th procedure is "ST1: deactivate operation preparation", for example. In this case, in response to input of an input signal indicating "operation preparation OFF" from the processing machine 72 to the PLC 30 and the operator's selection of a "NEXT" button on the guide screen 44, the management device 20 determines that execution of the procedure "ST1" has been completed. However, the management device 20 may determine completion of execution of the procedure based only on the detection result at the PLC 30 or only on the input instruction from the operator.

In either case, the management device 20 continues to display the message that prompts execution of the n-th procedure on the first UI device 26 until the management device 20 can determine completion of the n-th procedure. Upon visually recognizing the message, the operator operates the NC operation panel 86 to execute the procedure instructed by the message.

After completion of the n-th procedure (Yes in S46), the management device 20 checks the presence of the next procedure (S48). In the presence of the next procedure (Yes in S48), the management device 20 increments the parameter n (S50) and the process returns to step S44. In the absence of the next procedure (No in S4), the processing machine 72 has been transitioned to a recoverable condition, and the management device 20 therefore terminates the guide related to the processing machine 72 and the process proceeds to step S16 in FIG. 10. While FIG. 11 shows presentation of a plurality of procedures sequentially one by one, two or more procedures may be presented simultaneously.

Following the transition of the processing machine 72 to the recoverable condition, the management device 20 determines whether the robot 74 is in a recoverable condition (S16). This determination, which is made in a manner similar to that in step S12, will not be described in detail here. In response to the robot 74 not being in a recoverable condition, the management device 20 guides the recovery procedure for the robot 74 (S18). The flow of the guide for the robot 74 in step S18, which is substantially similar to the flow of guide for the processing machine 72 in step S14, will not be described in detail herein.

Thereafter, the stop time conditions are similarly confirmed for the peripheral device 76, the workpiece 100, and the sequence number of the production program, respectively. In response to the stop time condition being different from the recoverable condition, the management device 20 guides the recovery procedure for the target work element (S20 to S30). With all of the work elements being in recoverable conditions, the guide processing ends.

Here, in this example, after the processing machine 72 and the robot 74 have been placed in the recoverable conditions, the condition check (S24) and guide (S26) for the workpiece 100 are performed, as shown in FIG. 10. This configuration facilitates the recovery procedure of the workpiece 100. Typically, the recovery procedure of the workpiece 100 includes movement of the workpiece 100. In moving the workpiece 100, the movement of the workpiece 100 is obstructed by the robot 74 and the processing machine 72, when the position of the robot 74 and the position of the tool rest of the processing machine 72, for example, are not in an intended condition. In this example, the guide for the workpiece 100 is presented after the guides for the processing machine 72 and the robot 74. This allows the processing machine 72 and the robot 74 to have proper locations and positions before the movement of the workpiece 100, which facilitates the movement of the workpiece 100.

As is clear from the above description, in this example, at the time of abnormal stop of the machining cell 70, the cell controller 10 specifies the recoverable conditions of the respective work elements, and then presents, to the operator, the recovery procedure to transition each of the work elements to the recoverable condition. This enables the operator having poor knowledge or experience to properly recover the machining cell 70. The configuration described above is only an example, and the configuration of the cell controller 10 may be modified as appropriate. For example, while in the above example, the management device 20 and the PLC 30 are separate computers, the management device 20 and the PLC 30 may be integrated into a single computer. The second UI device 28, which is provided to facilitate the operation of the robot 74 in this example, may be eliminated.

The invention claimed is:

1. A cell controller configured to control a machining cell including a plurality of work resources, the plurality of work resources comprising at least one processing machine and at least one robot, the cell controller comprising:
    a programmable logic controller (PLC); and
    a management device including one or more processors, a memory, and one or more user interface user interface (UI) devices, wherein
    the PLC is configured to control operation of the plurality of work resources in accordance with an instruction from the management device and acquire conditions of a plurality of work elements including the plurality of work resources and a workpiece, and
    in response to occurrence of abnormal stop of the machining cell, the management device is configured to specify a recoverable condition of each of the plurality of work elements and present, to an operator, a guide to a recovery procedure that enables each of the plurality of work elements to transition to the recoverable condition,
    wherein the management device is configured to change a UI device that presents the guide, in accordance with each of the plurality of work elements, the machining cell comprises a safety fence that surrounds the at least one robot, the management device comprises a first UI device disposed outside the safety fence, the cell controller further comprises a second UI device that is portable and enables manual operation of the at least one robot, and the management device is configured to present the guide related to the at least one processing machine to the operator via the first UI device and present the guide related to the at least one robot to the operator via the second UI device.

2. The cell controller according to claim 1, wherein the management device prestores recovery condition information including the recoverable condition of each of the plurality of work elements recorded for each alarm type and transition information including the recovery procedure of each of the plurality of work elements recorded in association with the recoverable condition, is configured to specify the recoverable condition of each of the plurality of work elements based on the recovery condition information, and is configured to specify the recovery procedure based on the transition information.

3. The cell controller as defined in claim 1, wherein the management device presents the guide related to the workpiece to the operator after completion of the recovery procedure related to the at least one robot.

4. A cell controller configured to control a machining cell including a plurality of work resources, the plurality of work resources comprising at least one processing machine and at least one robot, the cell controller comprising:

a programmable logic controller (PLC); and a management device including one or more processors, a memory, and one or more user interface (UI) devices, wherein the PLC is configured to control operation of the plurality of work resources in accordance with an instruction from the management device and acquire conditions of a plurality of work elements including the plurality of work resources and a workpiece, and in response to occurrence of abnormal stop of the machining cell, the management device is configured to specify a recoverable condition of each of the plurality of work elements and present, to an operator, a guide to a recovery procedure that enables each of the plurality of work elements to transition to the recoverable condition, wherein the management device is configured to change a UI device to be operated by the operator that performs the recovery procedure, in accordance with each of the plurality of work elements, the at least one processing machine comprises a numerical control (NC) operation panel, the cell controller further comprises a second UI device that is portable and enables manual operation of the at least one robot, the recovery procedure related to the at least one processing machine includes operation of the NC operation panel, and the recovery procedure related to the at least one robot includes operation of the second UI device.

5. The cell controller according to claim 4, wherein the management device prestores recovery condition information including the recoverable condition of each of the plurality of work elements recorded for each alarm type and transition information including the recovery procedure of each of the plurality of work elements recorded in association with the recoverable condition, is configured to specify the recoverable condition of each of the plurality of work elements based on the recovery condition information, and is configured to specify the recovery procedure based on the transition information.

6. The cell controller as defined in claim 4, wherein the management device presents the guide related to the workpiece to the operator after completion of the recovery procedure related to the at least one robot.

7. A cell controller configured to control a machining cell including a plurality of work resources, the plurality of work resources comprising at least one processing machine and at least one robot, the cell controller comprising:

a programmable logic controller (PLC); and a management device including one or more processors, a memory, and one or more user interface (UI) devices, wherein the PLC is configured to control operation of the plurality of work resources in accordance with an instruction from the management device and acquire conditions of a plurality of work elements including the plurality of work resources and a workpiece, and in response to occurrence of abnormal stop of the machining cell, the management device is configured to specify a recoverable condition of each of the plurality of work elements and present, to an operator, a guide to a recovery procedure that enables each of the plurality of work elements to transition to the recoverable condition, the at least one processing machine comprises a numerical control (NC) operation panel, the management device comprises a first UI device, the recovery procedure related to the at least one processing machine includes operation of the NC operation panel, and the management device presents the guide related to the at least one processing machine to the operator via the first UI device.

8. The cell controller according to claim 7, wherein the management device prestores recovery condition information including the recoverable condition of each of the plurality of work elements recorded for each alarm type and transition information including the recovery procedure of each of the plurality of work elements recorded in association with the recoverable condition, is configured to specify the recoverable condition of each of the plurality of work elements based on the recovery condition information, and is configured to specify the recovery procedure based on the transition information.

9. The cell controller as defined in claim 7, wherein the management device presents the guide related to the workpiece to the operator after completion of the recovery procedure related to the at least one robot.

10. A cell controller configured to control a machining cell including a plurality of work resources, the plurality of work resources comprising at least one processing machine and at least one robot, the cell controller comprising:
  a programmable logic controller (PLC); and
  a management device including one or more processors, a memory, and one or more user interface (UI) devices, wherein
    the PLC is configured to control operation of the plurality of work resources in accordance with an instruction from the management device and acquire conditions of a plurality of work elements including the plurality of work resources and a workpiece, and
    in response to occurrence of abnormal stop of the machining cell, the management device is configured to specify a recoverable condition of each of the plurality of work elements and present, to an operator, a guide to a recovery procedure that enables each of the plurality of work elements to transition to the recoverable condition,
    the recovery procedure related to the workpiece includes movement of the workpiece and input operation of a location of the workpiece after being moved, and
    the management device registers the location of the workpiece after being moved in the PLC, the location being input by the operator.

11. The cell controller according to claim 10, wherein the management device
    prestores recovery condition information including the recoverable condition of each of the plurality of work elements recorded for each alarm type and transition information including the recovery procedure of each of the plurality of work elements recorded in association with the recoverable condition,
    is configured to specify the recoverable condition of each of the plurality of work elements based on the recovery condition information, and
    is configured to specify the recovery procedure based on the transition information.

12. The cell controller as defined in claim 10, wherein the management device presents the guide related to the workpiece to the operator after completion of the recovery procedure related to the at least one robot.

* * * * *